(12) United States Patent
Ista et al.

(10) Patent No.: US 9,276,358 B2
(45) Date of Patent: Mar. 1, 2016

(54) TRANSCEIVER MODULE RELEASE MECHANISM

(71) Applicant: Fourte Design & Development, Fremont, CA (US)

(72) Inventors: Tyler Ista, San Rafael, CA (US); Robert Golden, Discovery Bay, CA (US); Gioni Bianchini, Sunnyvale, CA (US)

(73) Assignee: FOURTE DESIGN & DEVELOPMENT, Fremont, CA (US)

( * ) Notice: Subject to any disclaimer, the term of this patent is extended or adjusted under 35 U.S.C. 154(b) by 0 days.

(21) Appl. No.: 14/288,925

(22) Filed: May 28, 2014

(65) Prior Publication Data

US 2015/0349462 A1    Dec. 3, 2015

(51) Int. Cl.
*H01R 13/627* (2006.01)
*H01R 13/629* (2006.01)

(52) U.S. Cl.
CPC ................................ *H01R 13/62905* (2013.01)

(58) Field of Classification Search
CPC .................................................. H01R 13/6272
USPC ................................................. 439/352, 464
See application file for complete search history.

(56) References Cited

U.S. PATENT DOCUMENTS

| | | | |
|---|---|---|---|
| 7,090,523 B2* | 8/2006 | Shirk et al. | 439/352 |
| 7,402,070 B1* | 7/2008 | Wu | 439/352 |
| 8,206,043 B2* | 6/2012 | Thirugnanam et al. | 385/92 |
| 8,226,305 B2* | 7/2012 | Thirugnanam et al. | 385/92 |

* cited by examiner

*Primary Examiner* — Phuong Dinh
(74) *Attorney, Agent, or Firm* — Foster Pepper PLLC; Richard A. Koske; P. G. Scott Born

(57) ABSTRACT

A transceiver module release system is disclosed. The system may be used to release a transceiver module housed in a cage that is permanently mounted on a printed circuit board. The release system may include a bail that rotates a slide-block through a slot to urge the bail forward in a slide-block path on the transceiver module. The bail has a hook shaped structure adapted to be connected with a detachable pull tab. As the bail begins to move forward from the locked position, wedge elements at the end of a pair of slide-block arms extending rearward from the bail may contact locking tabs on the cage, forcing the locking tabs outward. As the locking tabs are forced outward, the shoulders of the transceiver module are released, and the transceiver module is free to slide-block out of the cage as the operator pulls on the bail.

11 Claims, 5 Drawing Sheets

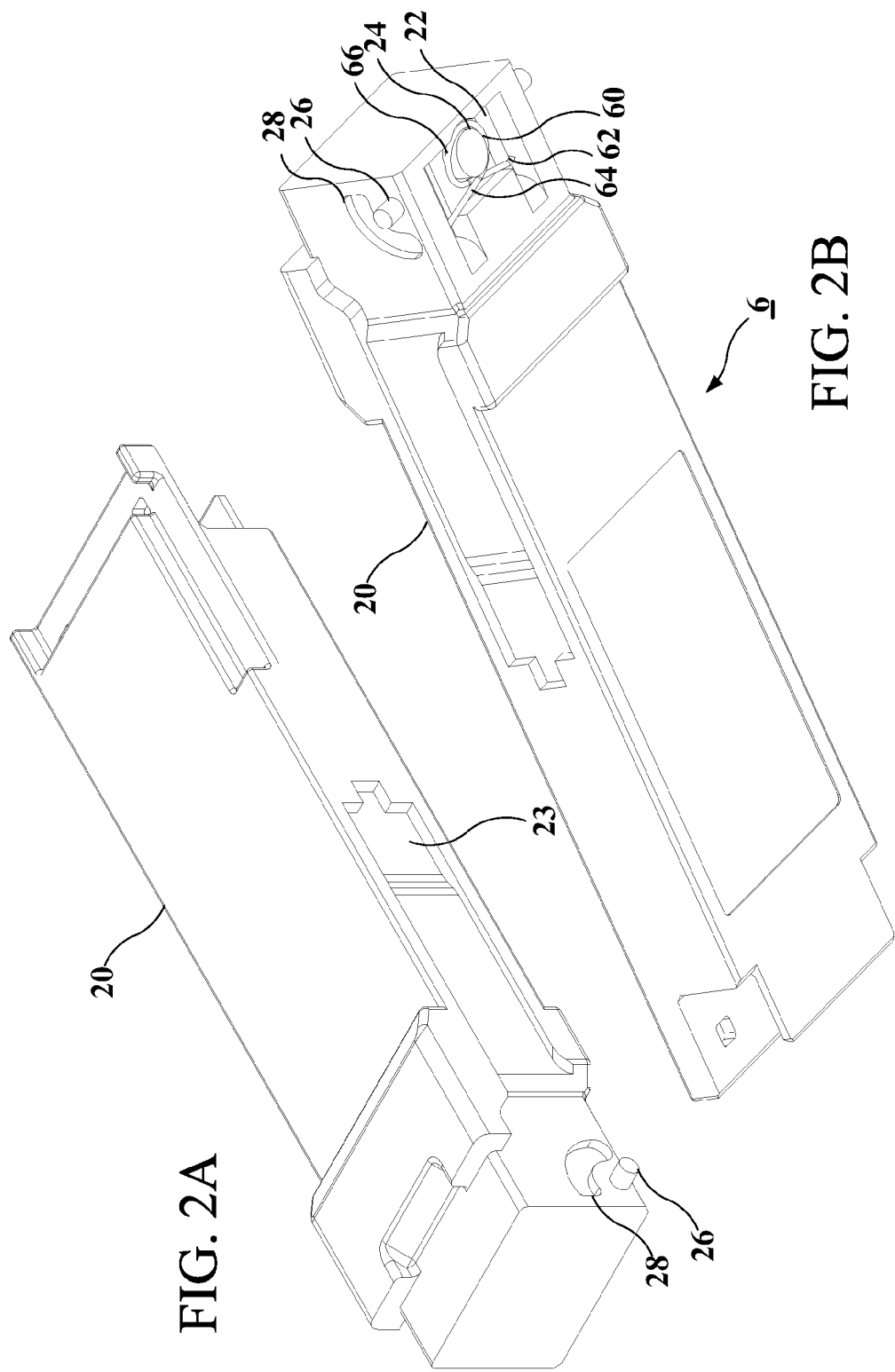

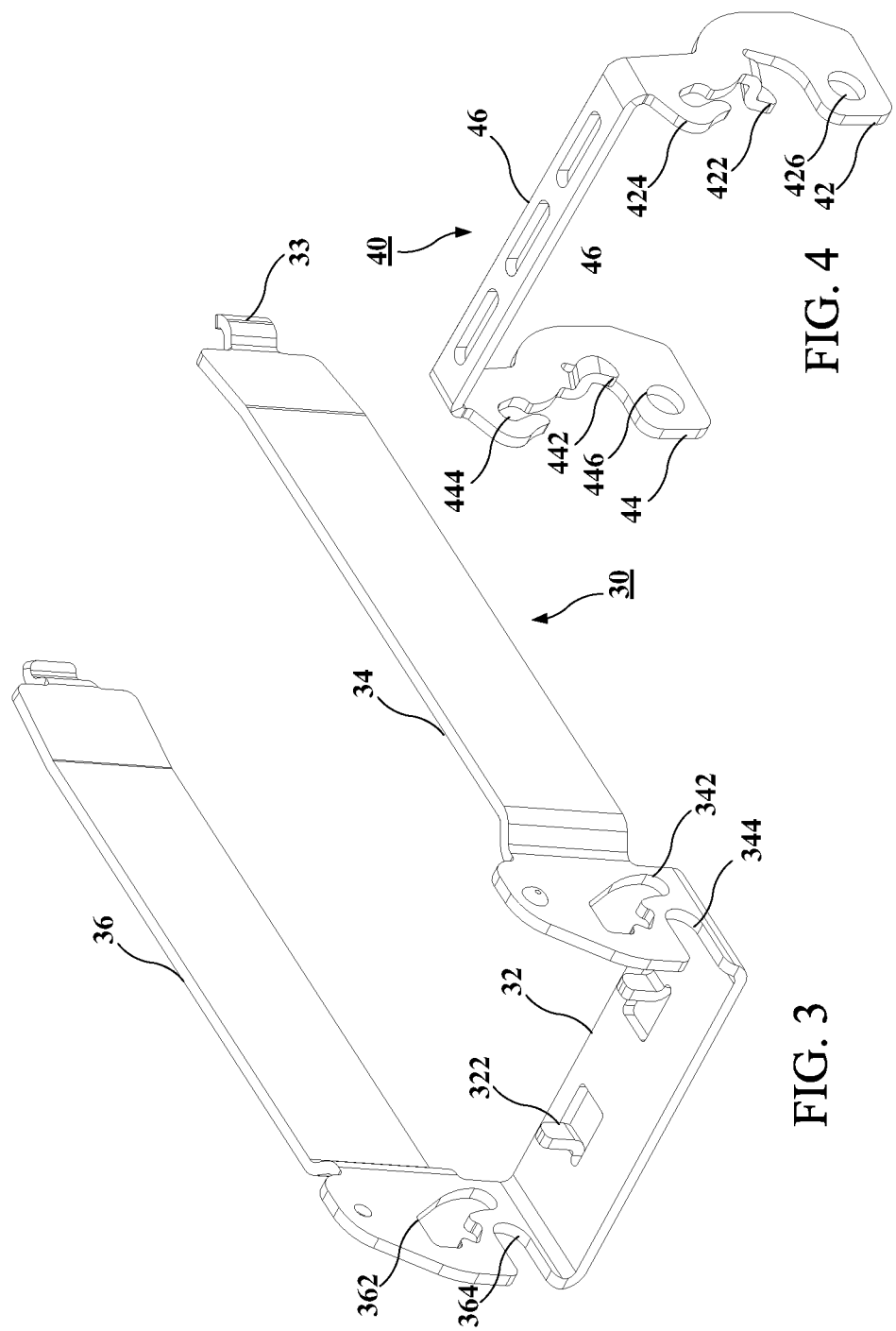

TRANSCEIVER MODULE RELEASE MECHANISM

FIELD OF THE INVENTION

Computers and related peripheral equipment, as well as satellite and communication systems in this technology age are constantly evolving and require ever increasing data transfer rates to perform highly complex tasks that drive the systems, such as digital signal processing, image analysis, and communication. To meet current demands, optical couplers are used to transfer signals over short and long distances between computers, between two circuit boards in one computer, and even between multiple chips on a single printed circuit board. The use of high speed optical signals in place of electrical interconnections increases the achievable data transfer rate to meet with current demands.

An optical transmitter/receiver (transceiver) module typically includes both light emitting devices such as vertical cavity surface emitting lasers (VCSEL's) and light detecting devices such as photodiodes. Driver/receiver circuitry modules, typically in the form of application specific integrated circuit (ASIC) chips, include driver circuitry to receive signals from one device and drive the VCSEL's in response. The ASIC also includes receiver circuitry to receive signals from the photodiodes and in response process those signals into an appropriate output. The combination of the VCSEL's, the photodiodes, and the ASIC circuitry is commonly referred to as an optical transceiver or a fiber optic transceiver. These optic transceivers are then plugged into printed circuit boards (PCB) to begin data transmission.

As the density of the optical arrays increases, coupling a fiber optic cable to the arrays becomes an increasingly complex task. It is extremely important to align the active area of each emitter and detector with a corresponding fiber of the fiber optic bundle, making space efficiency very important.

Please refer to the U.S. Pat. No. 8,226,305, it discloses a "FIBER OPTIC TRANSCEIVER MODULE RELEASE MECHANISM" that able to align the active area of each emitter and detector with a corresponding fiber of the fiber optic bundle. Furthermore, it comprises a bail have a handle one piece formed therewith, which the handle provides a top plate for the user to grasp the handle so as to rotate and pull the transceiver module out from the cage.

However, since the density of optical arrays is constantly increasing, the port density of circuit boards also increases. With the increased port density of pluggable transceivers in a circuit board, there is less and less room for users to use their fingers to actuate the standard release system of the pluggable transceivers. As such, improvements in the reliability and ease of removal of the pluggable transceivers are imminently required.

SUMMARY OF THE INVENTION

Exemplary embodiments of the present invention disclose a release system for a transceiver module. It should be mentioned that the present invention may be utilized on a fiber optic transceiver module, however, the present invention can also be utilized on direct attach copper (DAC) or any other transceiver module not be mentioned.

The system may include a bail rotatably mounted on the transceiver module. The bail may include a slide-block that partially surrounds an arm assembly so that the bail does not tend to separate from the arm assembly or from the transceiver module. The arm assembly may have a main body nested in the bail, and may further include a pair of arms that extend rearward. The arm assembly may include wedge elements at distal ends thereof, and the wedge elements may include an angled or arced surface. The transceiver module may be constructed to be received in a cage adapted to be affixed to a printed circuit board. The cage may include locking tabs in opposing side panels that fit into openings of the transceiver module to secure the module in the cage.

To release the transceiver from the module, firstly, the bail is closely disposed by the arm assembly, the bail may be driven by an external force applied by user via the pull tab connected therewith, then the bail may drive the arm assembly with a transceiver module from an installed position as an axis pin moves in a slot in the arm assembly and the slide-block moves through a an eccentric cam slot. It should be noticed that the slide-block is formed on the front linear surface of the bail instead of the rear linear surface for allowing the bail to immediately engage the arm assembly without non-necessary travel of the bail or pull tab after the force is applied thereto.

The advantage and spirit of the invention may be understood by the following recitations together with the appended drawings.

BRIEF DESCRIPTION OF THE DRAWINGS

FIG. 2A and FIG. 2B depicts a perspective view of the combination of a transceiver module with a spring in various angles.

FIG. 3 is a perspective view of the arm assembly according to a preferred embodiment of the present invention.

FIG. 4 is a perspective view of the bail according to a preferred embodiment of the present invention.

DETAILED DESCRIPTION

Figure 1A:
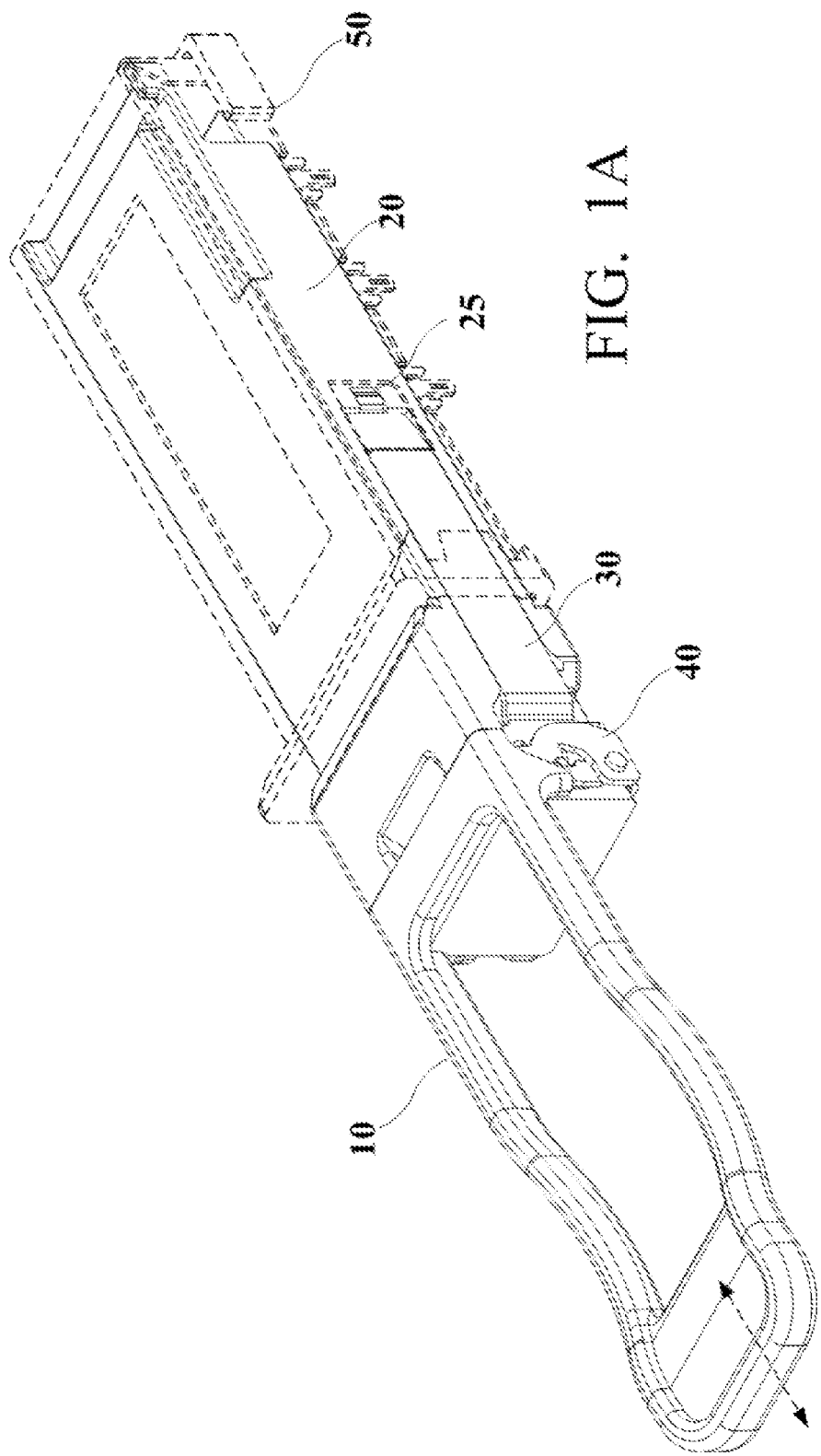
FIG. 1A and FIG. 1B depicts a perspective view of a transceiver module with a release system according to a preferred embodiment of the present invention in various angle.
Figure 1B:
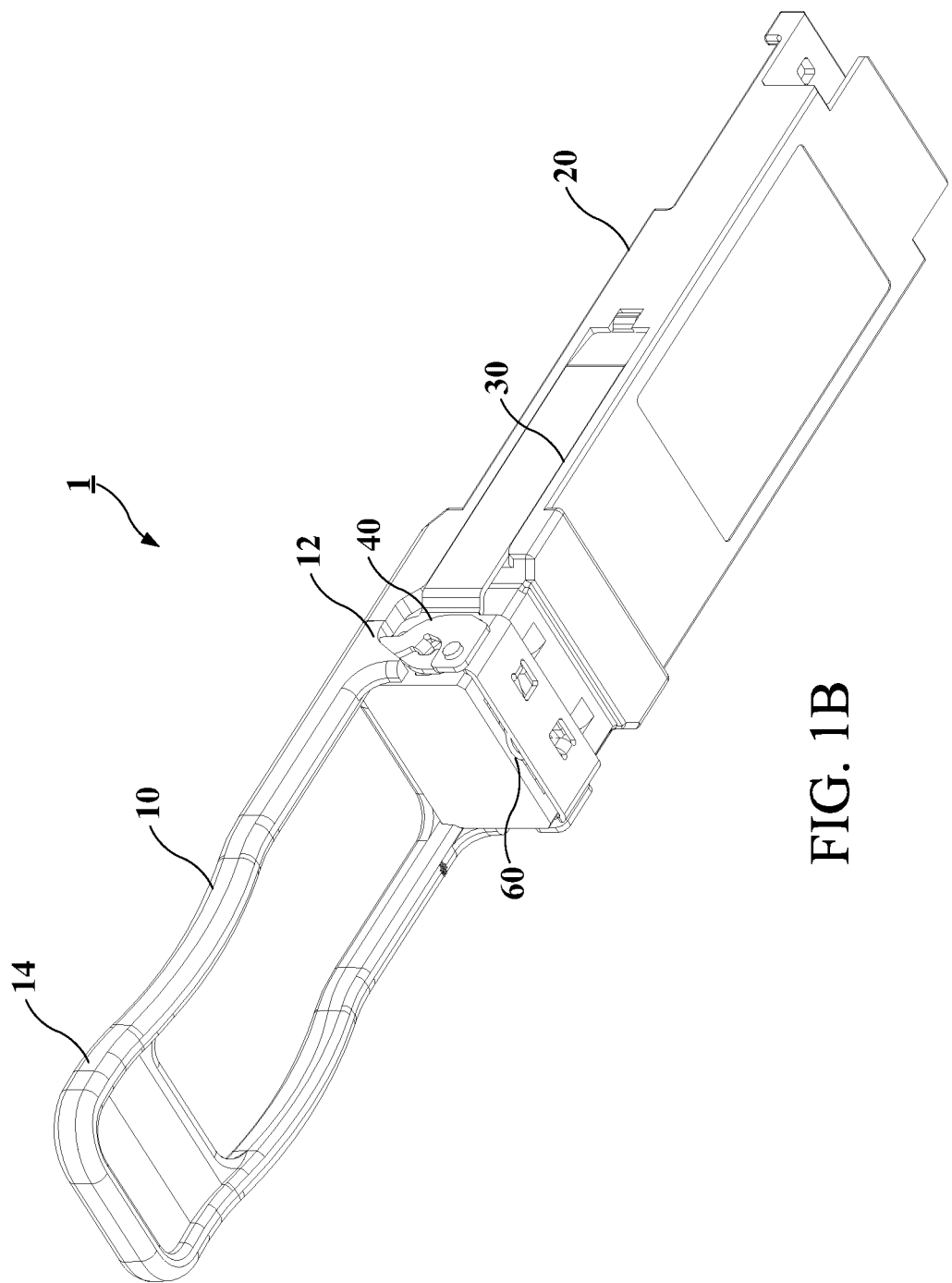

Exemplary embodiments of the present invention disclose a transceiver release system 1 as illustrated in FIGS. 1A to 1B. The release system 1 may comprises a pull tab 10, a transceiver module 20, a locking tab 25, an arm assembly 30, a bail 40, a cage 50 and a spring 60.

Figures 5A, 5B:
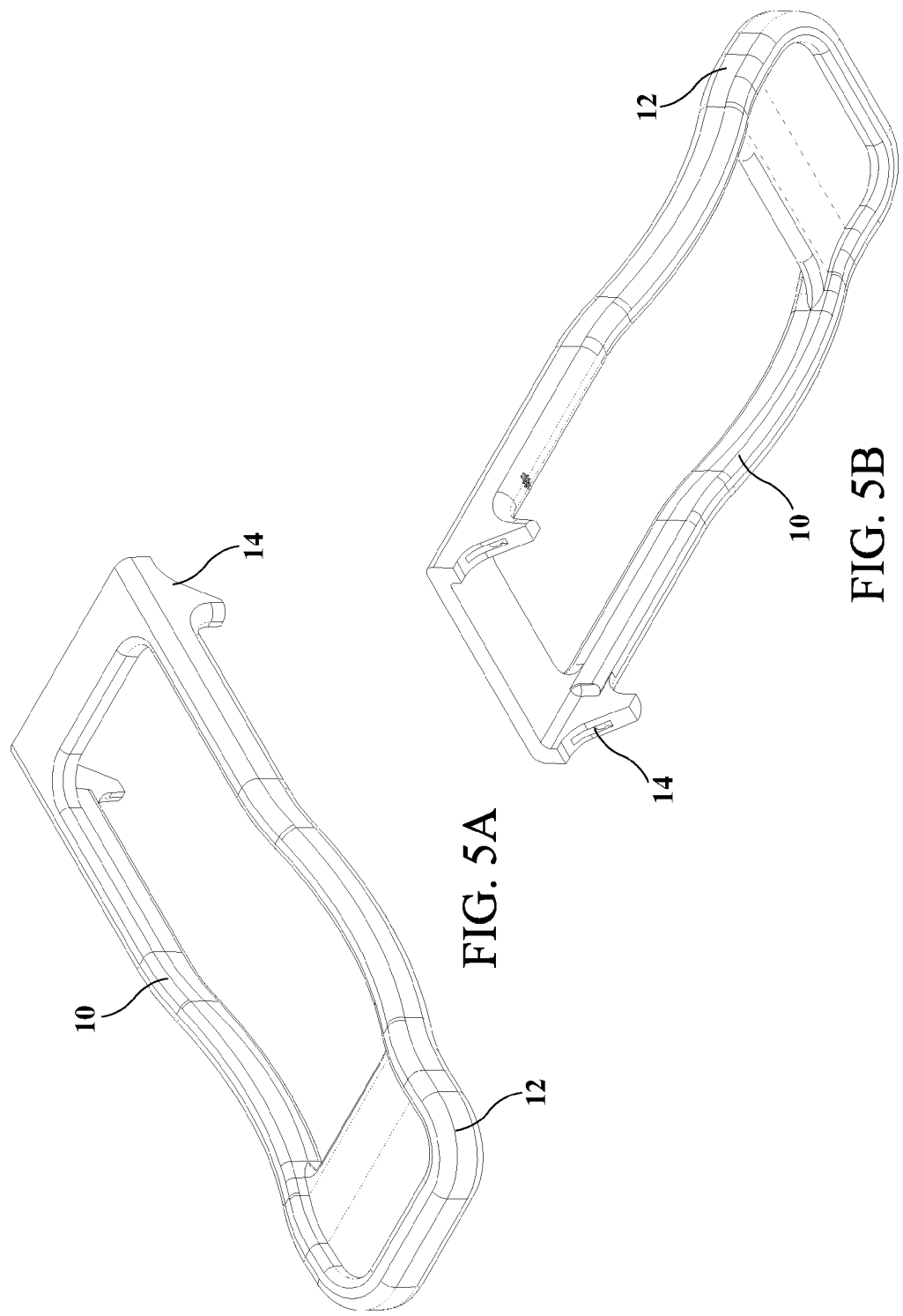
FIG. 5A and FIG. 5B depicts a perspective view of the pull tab in various angles.

Each of the said elements shall be described herein. Firstly, Please refer to the FIG. 5A and FIG. 5B, it is clearly shown a the pull tab 10 having a holding portion 12 and a connecting portion 14 connected thereto, the connecting portion 14 has a hollow structure with an axis adapted to allow a hook to be rotatably connected therewith and detachably removed therefrom. However, it should be known that the pull tab 10 is not necessarily be detachable but may also be permanently attached with the bail.

Please refer to the FIGS. 2A and 2B, FIG. 2A and FIG. 2B depicts a perspective view of the combination of a transceiver module with a spring in various angles. It is clearly shown that the transceiver module 20 having a concave 22 formed on the surface of the front end thereof. Furthermore, the transceiver module 20 has a protrusion 24 formed on the bottom of the concave 22 and extends therefrom for no higher than the depth of the concave 22. Moreover, it should be noticed that, the protrusion 24 may, but not limited to be, one piece formed with the transceiver module 20. Furthermore, both linear surface of the transceiver has a cam slot 28 and a column shaped axis pin 26 formed thereon, which the axis pin 26 may be one piece formed therewith or be mounted thereto.

Furthermore, the FIG. 2B also depicts a spring 60 having a torquing portion 66 connected with a first end 62 and a second end 64, which the torquing portion 66 forms a circle shaped hollow space.

Please refer to FIG. 3, FIG. 3 is a perspective view of the arm assembly. It is clearly shown that the arm assembly 30 having a bridge 32 connecting a first arm 34 and a second arm 36, the first arm 34 and the second arm 36 extend rearward from the bridge 32, the first arm 34 and the second arm 36 having an inner surface facing the transceiver module 20 and an outer surface corresponding thereto, the first arm 34 and the second arm 36 having a guiding channel 342,362 and a slot 344,364 formed on the surface thereof respectively. The bridge 32 has two protrusions (or called as linking portion) 322 formed on the inner surface and protrude toward the transceiver module 20. In the preferred embodiment as shown in FIG. 3, the protrusions 24 are one piece formed with the bridge 32 and formed by deforming the material of the bridge 32 toward the transceiver module 20 by, for example, punching means. Furthermore, a wedge element 33 may be formed on the end of the first arm 34 that may each include an angled or arced surface. The angled or arced surface allows the wedge elements 33 to move the locking tabs 25 from a locked position and out of the path of the transceiver module 20 in the cage 50 when the release mechanism is actuated. The wedge elements and the arms may at least partially define the openings in the transceiver module 20

Please refer to FIG. 4; FIG. 4 is a perspective view of the bail 40. It is clearly shown that the bail 40 has a top plate 46 connecting a first plate 42 and a second plate 44 at the ends thereof, which the first plate 42 and the second plate 44 are both approximately perpendicular to the top plate 46 and one piece formed therewith.

The first plate 42 and the second plate 44 have a slide-block (or called as a flange) 422, 442, a hook 424, 444 and an axis portion 426,446 respectively. Each of the said hooks 424, 444 may, but not essentially be, formed on the linear surface of the first plate 42 and second plate 44 and extends forward, away from the case, the hook 424, 444 being adapted to be connected with the detachable pull tab 10. Furthermore, each of the said slide-blocks 422, 442 extends inward from the linear surface of the first plate 42 and the second plate 44. Moreover, the said axis portion 426,446 of the first plate 42 and the second plate 44 may, but not limited to be, a through hole penetrating the inner surface and the outer surface thereof.

Furthermore, after the said members have been assembled as depicted in FIG. 1A or 1B, the spring 60 is disposed into the concave 22 and the protrusion 24 of the transceiver module 20 passes through the torquing portion 66 of the spring 60 so as to secure the position thereof, meanwhile, the first end 62 and the second end 64 of the spring 60 is respectively connected with the protrusions 322 formed on the bridge 32. It should be noticed that, the number of the protrusion 322 formed on the bridge 32 may be adjusted in accordance with the shape or the type of the spring 60. However, the bridge 32 may also comprises only one protrusion 322 instead of two according to the shape of the spring 60.

Moreover, the axis portion of the bail 40 is rotatably mounted on the arm assembly 30 and coupled to the transceiver module 20 by the axis pin 26 of the transceiver module 20 that passes through the guiding channel 344 of the arm assembly 30. Meanwhile, the first plate 42 and the second plate 44 is mounted on the outer surface of the first arm 34 and the second arm 36 respectively. Moreover, the slide-block 422, 442 of the first plate 42 and the second plate 44 penetrates through the slot 342, 362 of the first arm 34 and the second arm 36 respectively and the hook 424,444.

While in actual practice, the transceiver module 20 may be received in a cage 50 that is typically permanently mounted on a printed circuit board (not shown). Meanwhile, the transceiver module 20 may be held in place in the cage 50 by a pair of locking tabs 25 formed as part of the side panels of the cage. The locking tabs 25 may protrude inward so as to contact the transceiver module 20 when the transceiver module 20 is inserted into the cage. The locking tabs 25 may be received in openings defined in opposing sides of transceiver module 20 housing when the transceiver module 20 is fully inserted into the cage.

As the transceiver module 20 is inserted into the cage 50, a flat segment of the transceiver module 20 housing contacts the locking tabs 25, pushing the locking tabs 25 outward so that the transceiver module 20 can slide into the cage. When the transceiver module 20 is in the proper position in the cage, the locking tabs 25 rebound into the openings on each side of the module housing. The transceiver module 20 therefore cannot be removed from the cage 50 until the locking tabs 25 are released.

Furthermore, the angled or arced surface of the wedge elements may allow the wedge elements to move the locking tabs 25 from a locked position and out of the path of the transceiver module 20 in the cage 50 when the release mechanism is actuated. The wedge elements and the arms may at least partially define the openings in the transceiver module 20. More specifically, when the release system is in a locked position, the wedge element 33 of the arm assembly 30 is disposed in the fixing slot 23, and the at least one locking tab 25 protrudes into the fixing slot 23 so as to secure the transceiver module 20, and when the external force is applied to the bail 40, the arm assembly 30 moves to a forward position in the fixing slot, causing the wedge element 33 to push against the at least one locking tab 25 so as to move the at least one locking tab 25 out of the fixing slot 23, thereby releasing the transceiver module 20 from the cage.

The bail 40 may include a slide-block 422, 442 received in an eccentric cam slot 342, 362 in the arm assembly 30. The slide-block 422, 442 may wrap around the arm assembly 30 through the cam slot 342, 362 so that the slide-block 422, 442 may contacts either inner, outer or linear surfaces of the arm assembly 30. By enclosing the arm assembly 30, the configuration of the slide-block 422, 442 inhibit separation of the bail 40 from the arm assembly 30 and the transceiver module 20.

By directly contacting the bail 40 with the cam slot 342, 362, the travel path and the rotation angle of the bail 40 needed for the release process may be decreased. To initiate the release while the pull tab is installed with the hook of the bail 40, the user may pull the pull tab along a vertical direction, the pull tab drives the bail 40 according to rotate along the axis portion thereof, as the bail 40 is rotated forward, the As the bail 40 slide-block 422, 442 pulls the cam slot 342, 362 of the arm assembly 30 forward so as to bring the arm assembly 30 to move forward away the case, Moreover, when the arm assembly 30 is moved forward from the force exerted on the bail 40, the first end and second end of the spring 60 move forward as well and create a resisting force opposite of the exerted force. The resisting force causes the bail 40 and the arm assembly 30 to return back to their original positions after the external force is gone.

As the bail 40 rotates degrees, the slide-block exerts a force on the cam slot 342, 362 to pull the arm assembly 30 forward. As the arms move forward with the arm assembly 30, the angled or arced surfaces of the wedge element press against the locking tabs 25 of the cage. The forward motion of the wedge elements urges the locking tabs 25 out of the interior of the cage. The arm assembly 30 may move forward until the rear edge of guiding channel contacts the axis pin. At this point, the arms have been moved forward enough so that the angled or arced surface of the wedge element have moved the locking tabs 25 clear of the interior of the transceiver module 20. The transceiver module 20 is then free to slide out of the cage 50 as the operator continues to pull on the pull tab 10.

Furthermore, in the present embodiment, a pull tab 10 is attached to the bail 40. The hook of the bail 40 is connected to the connecting portion of the pull tab 10. The pull tab includes a holding portion 12 that is more convenient for a user to pull and exert a force on the bail 40. Thus, when the pull tab is pulled it actuates the bail 40 and release system 1 of the transceiver module 20. It should be noticed that, in rare case, the detachable pull tab 10 can be omitted and the user can still actuates the bail 40 via the top plate 46.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. A release system, the release system comprising:
 a transceiver module;
 a cage to receive the transceiver module, the cage having a locking tab, the cage being adapted to be mounted on a printed circuit board;
 an arm assembly, having a first arm and a linking portion connected therewith, the first arm having an inner surface facing the transceiver module and an outer surface corresponding to the inner surface, the first arm having a guiding channel and a slot formed on the surface thereof;
 a bail having a top plate and a first plate connected therewith, the first plate having a hook, an axis portion and a mortise, the hook being adapted to be connected with an pull tab, the bail is mounted on the outer surface of the arm assembly and being rotatably coupled to the transceiver module by an axis pin passing through the guiding channel of the arm assembly, the mortise of the bail penetrates through the slot of the first arm; and
 a restoration member, the restoration member is connected with the linking portion of the arm assembly and the transceiver module, the restoration member being disposed between the arm assembly and the transceiver module;
 wherein, when the release system is in a locked position, the transceiver module is fixed with the locking tab of the cage, while the external force toward forward is applied to the bail, the restoration member provides a resistant force to the arm assembly, the axis portion of the bail rotate to the axis pin and the mortise slide along the slot of the arm assembly, while the mortise contact with a linear surface of the slot, the mortise pushes the arm assembly module and the transceiver forward so as to separate the transceiver from the cage, while the external force is gone, the restoration member provide the resistant force to the bail for the recovery thereof.

2. The release system of claim 1, further comprising:
 a locking configuration including a boss disposed on one of the bail and the arm assembly and a dimple disposed on another of the bail and the arm assembly, the dimple being corresponding to the boss for receiving the boss so as to secure the bail in a locked position.

3. The release system of claim 1, wherein the restoration member is a spring.

4. The release system of claim 3, wherein the spring has a first end and a torquing portion connected thereto, the transceiver module has a concave and a positing protrusion, the concave formed on a surface of the transceiver module and the positing protrusion is formed on the bottom of the concave and extends outward therefrom, the positing protrusion passes through the torquing portion of the spring so as to secure the position of the spring, the first end of the spring is connected to the linking portion of the arm assembly for providing a recovery force thereto.

5. The release system of claim 1, the arm assembly further having a bridge connecting the first arm and a second arm, the first arm and the second arm extend rearward from the bridge, the first arm and the second arm having an inner surface facing the transceiver module and an outer surface corresponding thereto, the first arm and the second arm having a guiding channel and a slot formed on the surface thereof respectively, the bridge having at least one linking portion formed on the inner surface thereof.

6. The release system of claim 1, wherein the first arms includes a distal end, the distal end having a wedge element that defines at least a portion of an opening that receives one of the locking tabs therein.

7. The release system of claim 6, wherein the wedge element that contacts one of the locking tabs and pushes the locking tab outward when the bail is moved forward.

8. The release system of claim 6, wherein the wedge elements each comprise an angled or arced surface.

9. The release system of claim 6, wherein, the transceiver module having a fixing slot formed on a flank thereof, when the release system is in a locked position, the wedge element of the arm assembly is disposed in the fixing slot, and the at least one locking tab protrudes into the fixing slot so as to secure the transceiver module, and when the external force is applied to the bail, the arm assembly moves to a forward position in the fixing slot, causing the wedge element to push against the at least one locking tab so as to move the at least one locking tab out of the fixing slot, thereby releasing the transceiver module from the cage.

10. The release system of claim 1, wherein the mortise of the bail is adjacent to a linear surface of the slot of the first arm while the external force is not applied to the bail.

11. The release system of claim 1, wherein the mortise of the bail is a separate part fixed thereon.

\* \* \* \* \*